July 31, 1951 — O. CRULL — 2,562,775
FRUIT AND NUT HARVESTER
Filed April 19, 1948 — 5 Sheets-Sheet 1
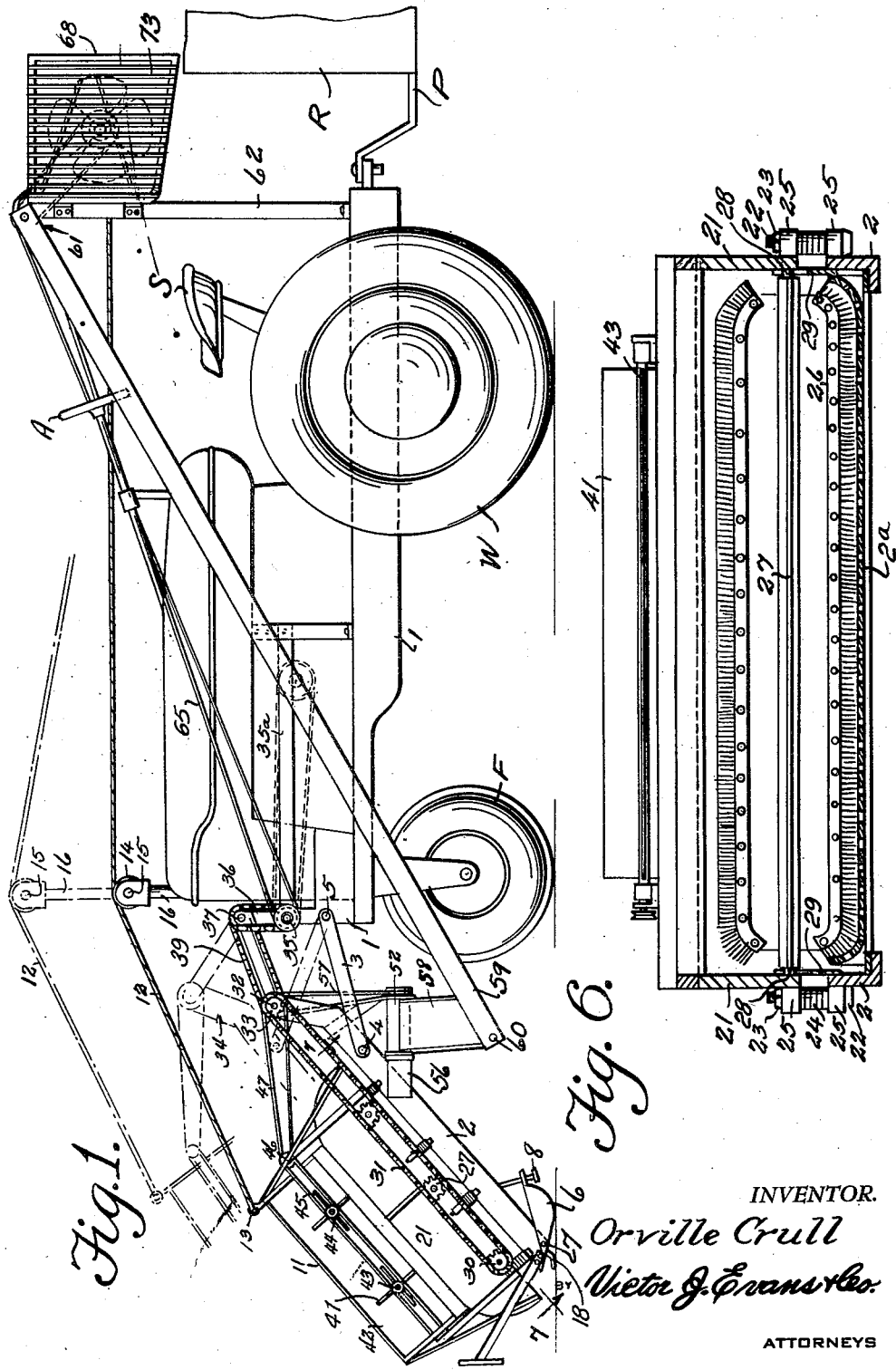
INVENTOR.
Orville Crull
Victor J. Evans & Co.
ATTORNEYS

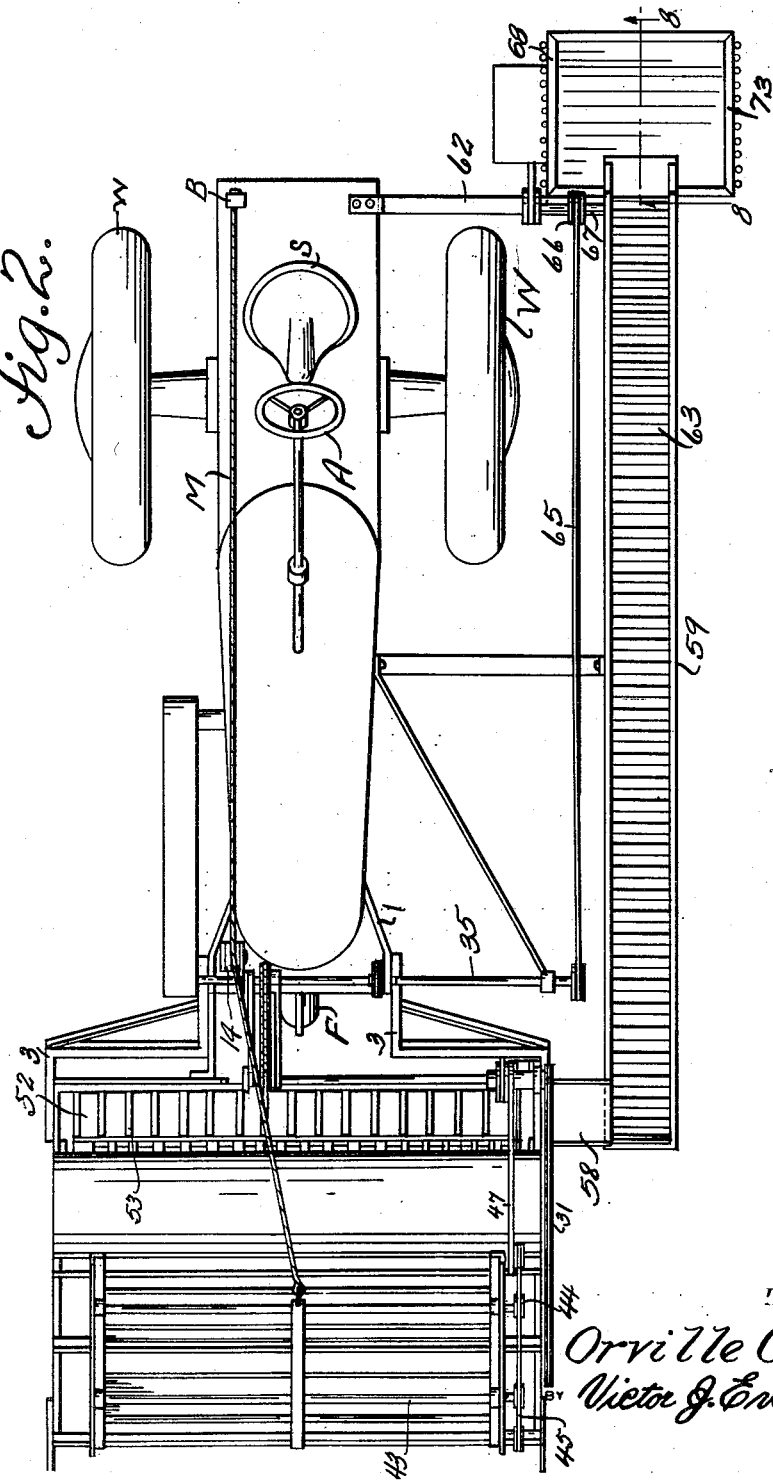

July 31, 1951     O. CRULL     2,562,775
FRUIT AND NUT HARVESTER
Filed April 19, 1948     5 Sheets-Sheet 3
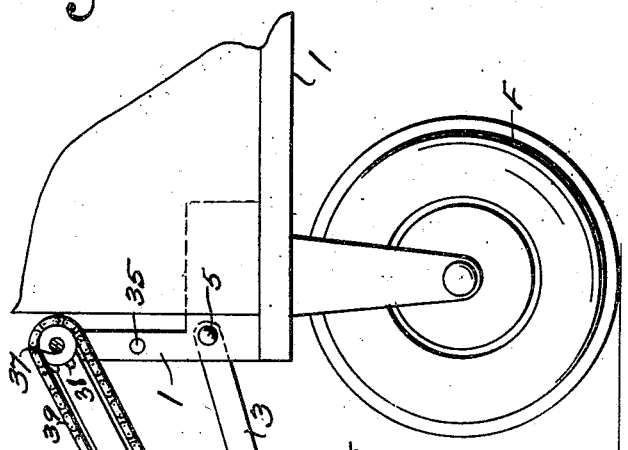
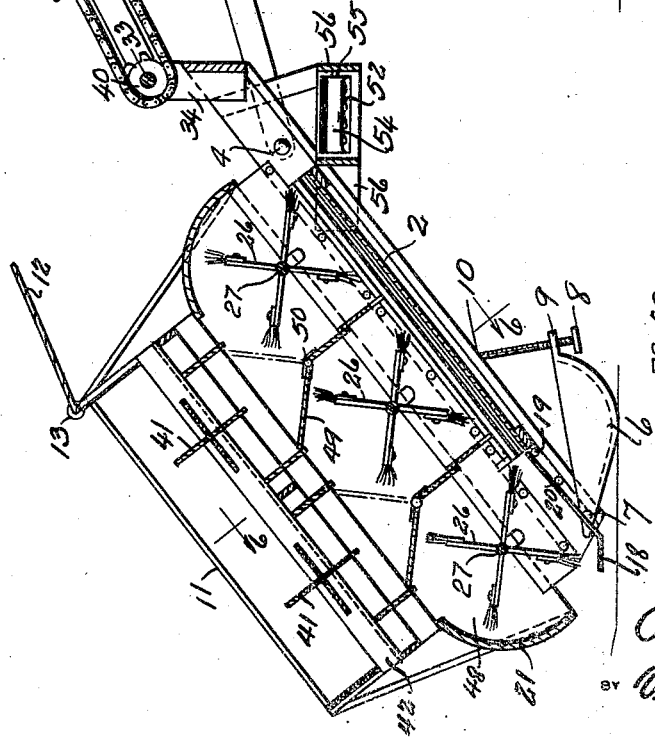
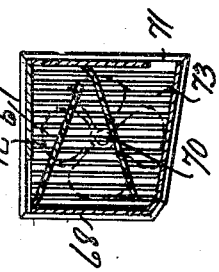
INVENTOR.
Orville Crull
BY Victor J. Evans & Co.
ATTORNEYS

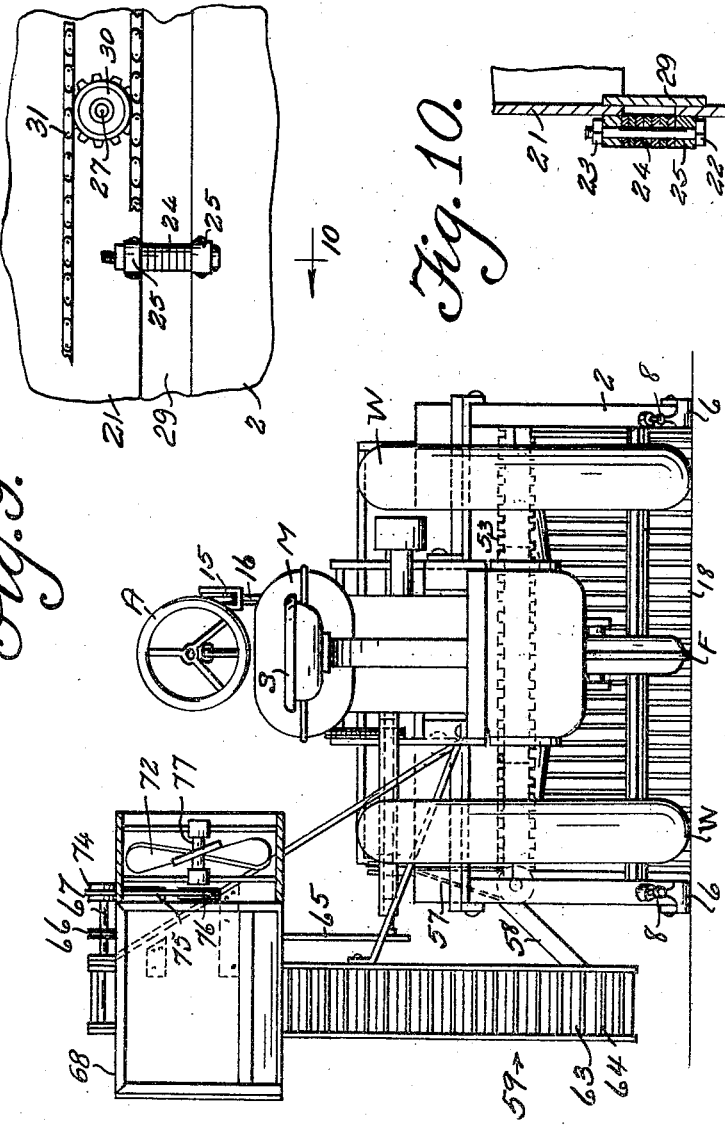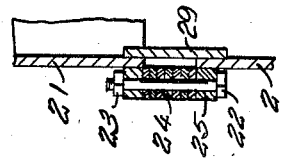

July 31, 1951　　　O. CRULL　　　2,562,775
FRUIT AND NUT HARVESTER
Filed April 19, 1948　　　5 Sheets-Sheet 5
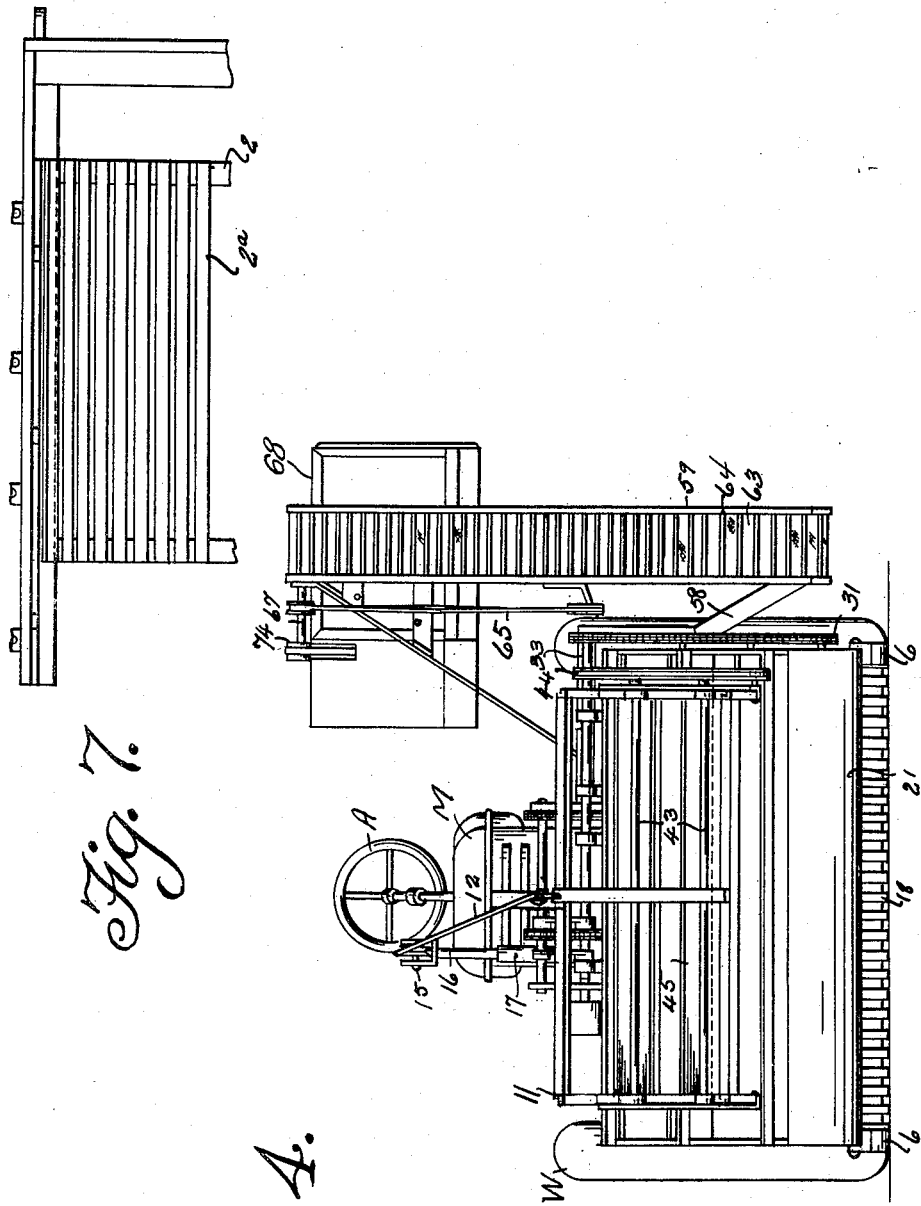
INVENTOR.
Orville Crull
BY Victor J. Evans & Co.
ATTORNEYS Patented July 31, 1951

2,562,775

UNITED STATES PATENT OFFICE 2,562,775

FRUIT AND NUT HARVESTER

Orville Crull, Darlington, Ind.

Application April 19, 1948, Serial No. 21,913

5 Claims. (Cl. 56—328)

The present invention relates to the general class of harvesters, and especially fruit gatherers of the type utilizing a motor operated implement having loading means of the rotary gathering type and employing endless conveyors, and more specifically to an improved fruit and nut harvester that is designed to pick up or gather a crop from the ground surface, separate dust, leaves, and other debris from the gathered crop, and convey the cleaned crop to a delivery hopper for final cleansing, and from which hopper the crop is deposited in containers for final commercial processing. The harvester is adapted to pick up a crop of ground crop of figs, walnuts, plums, and other similar fruit after the fruit has been shaken from the trees; and the harvester is equipped with readily adjustable gathering mechanism in order that the motor operated implement may be transported with convenience, and by means of the adjustment the gathering mechanism may operate in desired position with relation to the ground surface in gathering the crop.

The invention consists in certain novel features of construction and combinations and arrangements of parts involved in the harvester as will hereinafter be described and more particularly set forth in the appended claims.

In the accompanying drawings I have illustrated a complete example of a physical embodiment of my invention in which the parts are combined and arranged in accord with one mode I have so far devised for the practical application of the principles of my invention.

It will however be understood that changes and alterations are contemplated and may be made in these exemplifying drawings and mechanical structures, within the scope of my claims, without departing from the principles of the invention.

Figure 1 is a view in side elevation of a motor operating harvester of the tractor propelled type showing a physical embodiment of my invention.

Figure 2 is a top plan view of the implement in Fig. 1.

Figure 3 is a view in rear elevation, as seen from the right in Fig. 1; and

Figure 4 is a front view in elevation as seen from the left in Fig. 1.

Figure 5 is an enlarged longitudinal vertical sectional view through the gathering mechanism at the front of the implement.

Figure 6 is an enlarged vertical transverse sectional view through the gathering mechanism, at line 6—6 of Fig. 5.

Figure 7 is a detail fragmentary plan view showing the slatted bottom of the gathering trough.

Figure 8 is a vertical sectional view through the delivery hopper located at the rear of the implement on the line 8—8 of Fig. 2.

Figure 9 is an enlarged detail fragmentary view of the gatherer, showing the adjustment of parts and the chain drive for the rotary brushes or brooms; and Figure 10 is a detail sectional view at line 10—10 in Fig. 9.

In this illustrated embodiment of the invention I employ a motor operated and propelled implement, or automotive vehicle having a motor M, and a main frame 1, and equipped with two rear wheels W, W, and a front steering wheel F. The seat S is occupied by the driver where the steering mechanism A is readily accessible; and a rear platform P is supported from the main frame to accommodate another person who sorts the crop, and places the sorted crop in suitable containers for future processing.

The pick-up and gathering mechanism is adjustably suspended at the front of the implement, and this mechanism includes an upwardly inclined trough or box frame 2, having a slatted bottom 2a, which is supported from the main frame 1 by two side arms 3, 3, that are pivoted at 4 and 5 respectively to the gatherer and the frame, in order that the gatherer may be elevated, as indicated by dotted lines in Fig. 1, to inoperative position for transportation purposes.

The front gathering mechanism slides over the ground surface on laterally spaced slide shoes 6, 6, pivotally mounted at 7 on the trough 2, and these shoes are adjusted on their pivotal or hinge mounts by means of a screw bolt 8 that is threaded in a nut 9 rigid with the rear end of the pivoted glider or shoe, and the bolt has a bearing at 10 for engagement with the trough, whereby the shoes or gliders may be adjusted with relation to the adjustable trough, for supporting the gathering mechanism.

The shoe-supported gathering mechanism may be adjusted with relation to the ground surface for work, and it may be elevated to inoperative position for transportation purposes, by hydraulic mechanism operated from the motor M. For this purpose a suspending frame 11 is mounted over the gathering mechanism, and a cable 12 is attached to the frame at 13. The cable extends rearwardly and upwardly and passes over a sheave or pulley 14 journaled at 15 in a vertically reciprocable lifting bar 16 of a hydraulic motor 17 mounted on the main frame 1, and the rear end of the cable is anchored at B upon a suitable supporting part of the implement. Conventional manually operated means are employed for controlling and activating the hydraulic lifting mechanism, as usual.

At the lower front end of the gathering trough are mounted a transversely extending series of laterally spaced, angular pick-up fingers or slats 18 that project forwardly through the open front end of the trough 2, and the rear ends of these fingers are pivoted or hinged at 19 and provided with adjusting devices 20 by means of which the fingers may glide in elevated position in front of the shoes, pick up the ground crop, and as the implement advances, the gathered crop is passed to the rear and upwardly along the slatted bottom 2a of the trough 2.

As the gathered crop is passed to the rear and upwardly from the pick-up fingers, the crop is carried or conveyed over the slatted bottom through which some of the debris may fall, and in addition rotary fan blowers co-act with rotary brooms or brushes that sweep the crop along the slatted bottom, for separating leaves, dust, twigs, and other light debris from the crop. For this purpose a brush-housing 21 is adjustably mounted on the trough 2 by means of side bolts 22 (Figs. 9 and 10) having lock nuts 23 that provide a resilient support for the housing. The bolts are provided with helical springs 24 interposed between two spaced brackets or lugs 25, 25, one each on the trough and the housing, and the tension of the springs may be adjusted to vary the relation of the housing to the trough, and maintain a resilient support for the housing.

Within the housing are mounted a number of rotary brushes or brooms, here shown as three, and indicated as a whole each by the number 26. These brushes or brooms extend transversely of the implement and they successively sweep the crop along the slotted or slatted bottom of the trough; each brush having a shaft 27 journaled at 28 in bearings of the housing walls, and slotted guide plates 29 are mounted on the trough to provide clearance for adjustment of the housing on the trough.

The spaced brushes or rotary brooms are synchronized and driven by means of sprocket wheels 30 on their shafts 27, and a driven chain 31 passes over these sprockets from sprocket 32 on the brush operating shaft 33.

The brush or rotary broom operating shaft 33 is journaled in bearings at the upper end of the extension frame 34 of the trough 2, and the operating shaft is driven from a power take off shaft 35 that is driven by a power take off chain drive 35a from the motor M, as seen in Fig. 1.

The power take off shaft is journaled transversely of the implement at the front of the main frame, and by means of a vertical chain drive 36 to a swivel shaft 37 journaled in the main frame above the take off shaft, power is transmitted through sprocket 38 on the swivel shaft, chain 39 and sprocket 40 on the brush-operating shaft 33. By this swiveled arrangement of the power transmission mechanism, and the pivotal suspension of the gathering mechanism, the gathering mechanism may be adjustably suspended for work, as well as elevated to inoperative position for transportation of the implement.

As the fruit is being swept by the rotary brooms through the gathering trough, leaves, dust, and other light debris is separated by rotary fan blowers from the crop, which fan blowers 41 are mounted over the brooms in a housing 42 in the side walls of which the shafts 43 of the fan blowers are journaled. Exterior of the housing 42 the shafts 43 are each provided with a pulley 44 and these pulleys are rotated by a drive belt 45 and pulley 46 from the broom operating shaft by belt drive 47.

As best seen in Fig. 5 the housing for the rotary brooms or brush-conveyors is divided into interior compartments as 48, 48 that open to the fan compartments in the fan housing 42, and reversible gates 49 are hinged at 50 within the brush compartments, to selectively deflect the dust and light debris arising from the broom compartments, and then the fan blowers create air currents that disposed of the debris.

As the debris is separated from the crop of fruit, the rotary brushes or brooms sweep the fruit up the slotted or slatted inclined bottom of the trough, and the fruit is discharged from the upper open end of the inclined trough 2 upon a transversely arranged endless belt or carrier 52 having cross slats or cleats 53 mounted thereon.

The endless belt is mounted upon spaced rollers 54 having shafts 55 journaled in bearings of the supporting frame 56 attached to the gathering trough; and this carrier or endless belt is also driven from the broom-operating shaft 33, as by a belt drive 57.

At one end of the transverse carrier 52, the fruit is dropped therefrom by gravity upon an inclined chute 58, and the fruit is thus deposited at the lower end of an upwardly inclined elevator that is mounted in a frame 59 located at one side of the implement, connected at 60 to the chute, and with its rear upper end mounted at 61 upon an upright frame 62 located adjacent the platform P and supported on the main frame of the implement.

An endless elevator belt 63 having cross slats or cleats 64 is operated from the power take off shaft 35 by a take off belt or chain 65 passing over the driven wheel 66 on the elevator operating shaft 67, and the endless belt conveyor or elevator is driven by usual end rollers journaled in bearings in the side walls of the frame 59.

From the upper end of the hopper the fruit is delivered to a hopper 68 mounted on the frame 62, and the open-top hopper is provided with two interior oppositely inclined partitions 69 and 70, or drop boards, over which the fruit cascades on its way to the lower delivery mouth or opening 71 of the hopper, and from this opening the fruit is delivered into a suitable receptacle, as R, mounted on the platform P.

For a final cleansing of the fruit a rotary fan blower 72 is mounted exterior of the hopper to blow a blast through the adjoining grilled or slotted side wall 73 of the hopper, and thereby remove any remaining dust from the fruit. The fan blower is operated from the elevator operating shaft, as seen in Fig. 9 by a drive pulley 74, belt 75, and driven pulley 76 on the fan shaft 77, and the air blast passes through the slotted wall and thence out through the open top of the hopper.

Having thus fully described my invention, what I claim and desire to secure by Letters Patent is:

1. In a harvester of the type described including a motor operated vehicle having a main frame, the improvement comprising a gathering trough having ground engaging supporting shoes and a pivotal suspension from the frame, a rope attached to said trough and operative means engaging said rope to tighten said rope for adjusting the trough in a vertical plane, a housing, apertured ears on said housing and said trough, bolts passing through said ears and a spring sleeved on each bolt and engaging said ears to resiliently support said housing on said trough a plurality of rotary brooms mounted in the housing over and sweeping through the trough, power take-off mechanism from the vehicle, transmission mechanism between the take-off mechanism and the rotary brooms, means connected to the trough for adjusting the trough in a vertical plane.

2. In a harvester of the type described including a motor operated wheeled implement having a main frame and a power take-off shaft, the improvement comprising a gathering trough pivotally mounted on the frame, and means for vertically adjusting the trough, a housing resiliently supported over the trough and means for relatively adjusting the housing, a plurality of rotary brooms journaled in the housing to sweep through the trough, power transmission mechanism between the shaft and said brooms, and means located over the housing for separating debris from the crop.

3. In a harvester as described, the improvement comprising a gathering trough, a broom-housing mounted over the trough and means for relatively adjusting the housing, and a blower-housing mounted over the broom-housing, a plurality of rotary brooms mounted in the broom-housing to sweep through the trough, a plurality of rotary fan blowers mounted in the blower-housing for separating debris from the broom-housing, a power take-off shaft, transmission mechanism between said shaft and the rotary brooms, and power transmission from said shaft for operating the fan blowers.

4. The invention as in claim 2 wherein the gathering trough is provided with a slatted bottom, a plurality of ground engaging shoes, and a series of transversely arranged pick up fingers mounted in advance of the shoes.

5. The invention as in claim 2 wherein the means for vertically adjusting the trough comprises an attaching frame mounted over the trough, an elevating cable attached to the attaching frame and a hydraulic motor means mounted on said harvester having an operative connection with the cable.

ORVILLE CRULL.

REFERENCES CITED

The following references are of record in the file of this patent:

UNITED STATES PATENTS

| Number | Name | Date |
| --- | --- | --- |
| 217,399 | Pendleton | July 8, 1879 |
| 741,304 | Butler | Oct. 13, 1903 |
| 1,330,488 | Nelson | Feb. 10, 1920 |
| 1,378,275 | Rodemacher | May 17, 1921 |
| 1,619,851 | Coley | Mar. 8, 1927 |
| 1,971,495 | McGee et al. | Aug. 28, 1934 |
| 2,065,169 | Carpenter | Dec. 22, 1936 |
| 2,230,139 | Gustin | Jan. 28, 1941 |
| 2,310,387 | Blair et al. | Feb. 9, 1943 |
| 2,363,888 | Martin | Nov. 28, 1944 |
| 2,458,224 | Thompson | Jan. 4, 1949 |